Sept. 22, 1964 W. R. EDWARDS ETAL 3,150,200
RECOVERY OF TERTIARY ISOHEXENE BY SULFURIC ACID EXTRACTION
Filed June 7, 1961
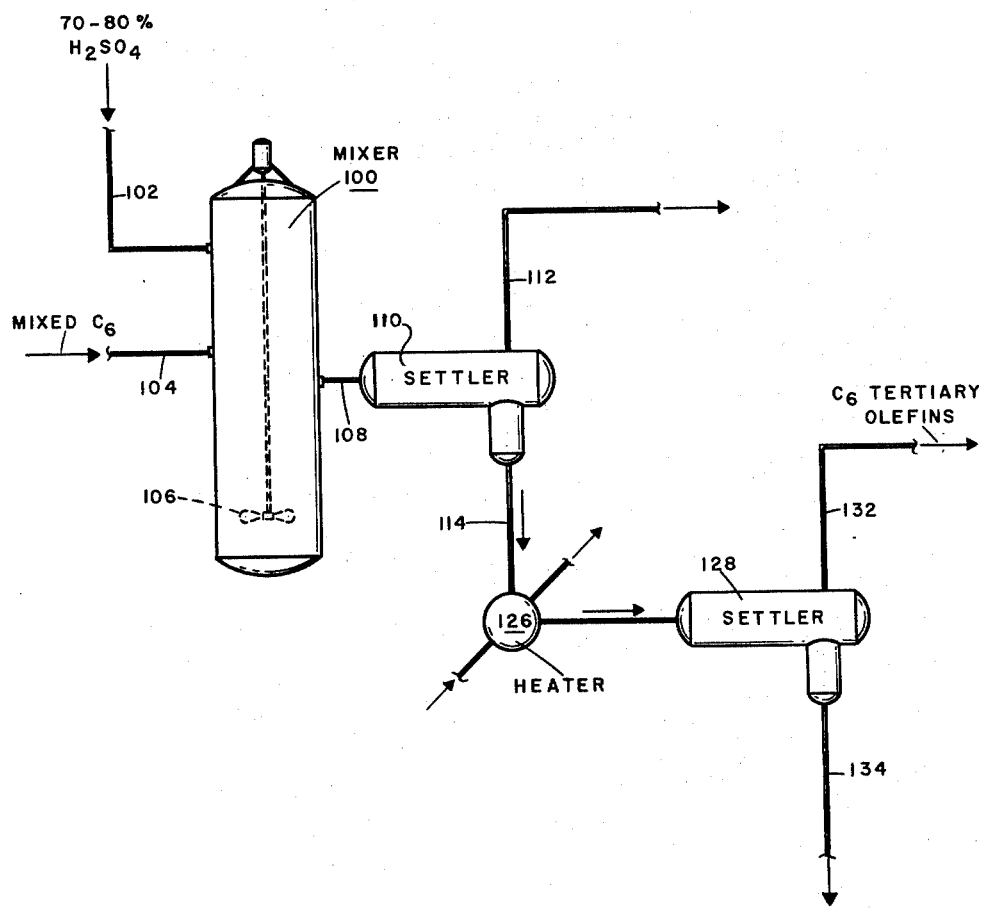
INVENTORS.
WILLIAM R. EDWARDS,
ROBERT D. WESSELHOFT,
BY BERT B. WILLIAMS,
John B. Davidson
ATTORNEY.

United States Patent Office 3,150,200
Patented Sept. 22, 1964

3,150,200
RECOVERY OF TERTIARY ISOHEXENE BY SULFURIC ACID EXTRACTION
William R. Edwards and Robert D. Wesselhoft, Baytown, Tex., and Bert B. Williams, Princeton, N.J., assignors, by mesne assignments, to Esso Research and Engineering Company, Elizabeth, N.J., a corporation of Delaware
Filed June 7, 1961, Ser. No. 115,324
6 Claims. (Cl. 260—677)

The present invention relates to the production of high purity tertiary olefins. More particularly, the present invention deals with the selective extraction of tertiary isohexenes from an admixture with their isomers by contacting the hydrocarbon mixture with high concentration sulfuric acid at a temperature of about 0° F. to 60° F., followed by the separation from the acid phase of the chemically absorbed tertiary isohexene to recover the tertiary isohexene as a substantially pure product.

Prior to the discoveries of the present invention, it was thought to be impossible to utilize acids of a concentration higher than about 65% because of a supposed loss in product selectivity in the extraction step. For example, it was thought that at 65% acid strength, considerable of the hydrocarbons other than the tertiary olefins would pass into the acid phase, and would thereby result in the recovery of an olefin product contaminated by the hydrocarbons other than tertiary olefins extracted from the hydrocarbon mixture. The use of acid concentrations of more than 65% is highly desirable in that for a given plant size, the capacity during continuous operations will be increased if higher concentration sulfuric acid is utilized as the extraction liquid. This is so because of the higher capacity of the more concentrated acid for chemically absorbing tertiary olefins from the feed stock of admixed hydrocarbons. Stated somewhat differently, for a given capacity of recovery of tertiary olefins, the investment in plant and equipment will be minimized by utilizing the higher acid concentrations. It is, therefore, seen that in providing a method for utilizing the higher acid concentrations, the present inventors have provided a process of great commercial importance.

Besides the problem of selectivity in the extraction step, the use of higher acid strengths in the sulfuric acid extraction gives rise to problems of excessive polymerization during recovery of the absorbed olefin from the acid phase. It is well known in the art that as the acid concentration is increased, the polymerization rate also increases. It would, therefore, be expected in the use of higher acid concentrations, as set forth in the present invention, that the recovery of the tertiary olefins from the acid environment would be accompanied by prohibitive losses of the olefin due to polymerization. It has surprisingly been found, by the practice of the present invention, that the losses due to polymerization may be minimized during the recovery step by heating the acid extract phase indirectly at a heating rate higher than a minimum at which the polymerization losses reach an economic maximum. It has been determined that a minimum heating rate of 400° F. per minute may be utilized and yet obtain a commercially feasible process. It is desired, however, that the heating rate be at a minimum of about 2000° F. per minute and more preferably at above 4000° F. per minute. It should be understood that as the heating rate is decreased, the polymerization losses will increase to an economically feasible maximum which obtains at the lower heating rates.

Further, it has been found that the extract may be heated to a considerably higher temperature without prohibitive polymerization losses by using the fast heating rates of the present invention. This allows more complete recovery of the tertiary olefin from the acid extract environment than heretofore possible.

Therefore, the present invention may be summed up as setting forth a process for the extraction of tertiary isohexenes by utilizing sulfuric acid of between 70% and 80% concentration, and by recovering the absorbed olefin by indirectly heating the extract phase to a temperature at which substantially all of the olefin is released from the acid, and at an indirect heating rate in excess of 400° F. per minute.

A better understanding of the process may be obtained by a reference to the drawing, wherein a schematic diagram of the practice of a preferred mode of the present invention is set forth.

Referring now to the drawing, the mixed hydrocarbon charge comprising isometric $C_6$ hydrocarbons, including tertiary isohexene, is introduced by line 104 into a mixer 100 and admixed with sulfuric acid of 70% to 80% by weight concentration. The acid is introduced into the mixer 100 by line 102. The acid and hydrocarbon are mixed at a temperature of about 30° F. and at atmospheric pressure by means of the mixing means 106. The admixed acid and hydrocarbon are then passed by line 108 to a settler 110, wherein a raffinate phase and an extract phase are formed. The raffinate phase is removed by means of line 112, while the extract phase is passed by line 114 into a heater 126. The extract phase is heated in the heater 126 at a rate of at least 400° F. per minute to a final temperature of at least 200° F., whereby the tertiary isohexene is released from the extract phase. The heat may be supplied, for example, by a steam jacket, by steam coils, by a hot process stream, or other source of indirect heat. The rate of heating in the heater 126 is critical. As the extract phase is heated to the final temperature, a hydrocarbon phase is formed, which comprises the released tertiary $C_6$ olefins, and the remaining phase is substantially free of combined olefin. This two-phase system is introduced by means of a line into a separator 128, wherein the $C_6$ tertiary olefins are removed by line 132, while the spent acid is removed by means of line 134.

The advantages of utilizing an acid of higher concentration than the 65% maximum heretofore postulated by the prior art is illustrated by the data collected in the following table.

TABLE I

| Charge, gals. | | Acid strength, wt. percent $H_2SO_4$ | Olefin absorbed by acid |
|---|---|---|---|
| Hexenes | Acid | | |
| 2.5 | 7.5 | 75 | 57 |
| 3.0 | 7.5 | 70 | 45 |
| 3.0 | 7.5 | 65 | 25 |

As is seen by the data of Table I, by increasing the acid strength from 65% to 70%, the olefin absorbed by the acid increases from 25% to 45% by weight, based on the absorbing acid. This increase of 5% in the acid concentration then is accompanied by an increase almost twofold in the capacity of the acid to absorb the tertiary olefin from the hydrocarbon mixture.

The utilization of acid of even 65% acid concentration has been thought to be impractical in the prior art where indirect thermal regeneration of the acid extract was utilized without dilution of the acid. An experimental run based upon the maximum heating rate of the prior art illustrated that a polymerization loss of 14.8% was suffered while regenerating only 92.3% of the original olefin. This experimental run is set forth as Example I below.

Example I

A hydrocarbon stream containing tertiary isohexenes in admixture with its $C_6$ isomers was contacted with 65% sulfuric acid at a temperature of about 30° F. and an acid extract recovered containing about 13% tertiary isohexenes. The fat acid extract (325 g.) was charged to an indirect heating regeneration zone wherein the fat acid was heated at a rate of 40° F. per minute to a final temperature of 158° F. The regeneration zone was maintained at a pressure of 100 mm. of mercury during the heating process. At the completion of the heating step, the supernatant hydrocarbon layer was separated and analyzed and found to contain 85.2% recovered tertiary isohexenes and 14.8% polymer. Only 92.3% of the absorbed tertiary isohexanes were regenerated during the heating step. The remaining acid phase was maintained under the reduced pressure for an additional 45 minutes and the remaining olefin was finally removed.

As exemplary of the practice of the present invention, wherein the acid extract phase or fat acid is heated to a temperature sufficient to release substantially all of the tertiary olefin which has been absorbed therein and to indicate the relative polymerization and percentage of regeneration which are accomplished by using acids of increasing concentration, a series of runs were made. In these runs, a $C_6$ cut from catalytic naphtha was extracted with sulfuric acid of varying concentrations. The resulting fat acid contained from 13% to 26% olefins by weight. The fat acid was regenerated by direct thermal heating at the indicated rate and to final temperatures sufficient to obtain at least 94% regeneration in the 75% acid and 100% regeneration in the case of 70% and 65% sulfuric acid. The data from these runs are recorded in the following Table II.

TABLE II

| Run No. | Acid strength | Temp., °F. | Acid fatness, wt. percent | Heating rate, °F./m. | Olefin regen., wt. percent | Polymer, wt. percent |
|---|---|---|---|---|---|---|
| 1 | 75 | 240 | 26 | 3,400 | 94 | 18.3 |
| 2 | 75 | 250 | 26 | 9,560 | 96 | 16.2 |
| 3 | 70 | 221 | 22 | 4,250 | 100 | 9.1 |
| 4 | 65 | 180 | 13 | 2,792 | 100 | 4.8 |

By reference to the data in Table II, supra, it will be seen that in utilizing acids of 65% concentration and an acid fatness of 13%, a temperature of 180° F. was sufficient to provide 100% regeneration of the absorbed isohexenes. The heating rate of 2792° F. per minute was accompanied by a polymer formation of only 4.8% by weight. Where the acid strength was increased to 70% in the extraction step, by reference to Table I, the advantage of the increased acid strength is apparent; an acid fatness of 22% was obtained which upon heating to a temperature of 221° F. yielded 100% of the absorbed olefin at a polymerization rate of only 9.1 weight percent. A heating rate of 4250° F. per minute was employed. This should be compared to the results of Example I wherein a 65% acid was utilized in the extraction step, and the fat acid was heated only to 158° F. to provide 92.3% regeneration. In Run 3, it is seen that although a higher acid strength was used, 100% regeneration was accomplished at a polymerization rate of only about three-fifths of the polymerization losses which were incurred at the milder conditions set forth in Example I. The use of the extremely high heating rate in Run 3 of Table II is responsible for the minimizing of the polymerization rate. A comparison of Run 4 in Table II with the results of Example I will show that for similar conditions with the exception that the final temperature was raised to an even more rigorous high, the 65% acid extract was regenerated 100% at a polymerization loss of only 4.8% by weight, about one-fifth of the polymerization losses under similar conditions in Example I. It should be noted that the heating rate utilized in Run 4 is 2792° F. per minute, considerably higher than the 40° F. per minute proposed by the prior art. In general, the temperature required for complete olefin regeneration depends on the acid strength. For isohexenes in 65% sulfuric acid, 140° F. is a suitable minimum; for 70% acid, 200° F. is required; while in 75% acid, the temperature must exceed 250° F.

Runs 1 and 2, set forth in Table II, indicate the use of 75% by weight sulfuric acid in the extraction step. A comparison of the acid fatness which was utilized in 75% acid with that at 65% acid indicates that considerably more of the olefin was absorbed in the 75% acid phase. The temperature upon regeneration was raised to 240° F. in Run 1 and 250° F. in Run 2. In Run 1, a heating rate of only 3400° F. was used, while in Run 2 a heating rate of almost three times that was utilized. It should be noted that the regeneration obtained from the 75% acid was a minimum of 94% with a polymerization loss of 18.3%, which is only a little more than a fourth greater than that experienced in Example I while using 65% acid. At the higher rate of heating in Run 2, substantially the same polymerization losses at 75% acid strength were sustained as by the prior art method for utilizing the weaker 65% sulfuric acid. It is thus apparent, that the present inventors have set forth a process for the recovery of tertiary isohexenes from an admixture with the isomers thereof wherein a much more concentrated acid may be used in the extraction step while suffering polymerization losses less than (or at most, equivalent to) the losses obtained in the practice of the prior art process, while doubling the capacity of the extraction and recovery unit.

The inventors having disclosed in detail the essence of the invention and all of the aspects thereof, and having set forth the preferred mode of practicing the invention, what is desired to be protected by Letters Patent should be measured not by the specific examples hereinabove given, but only by the appended claims.

We claim:

1. A method of recovering tertiary isohexene from admixture with its isomers which comprises contacting the admixture containing said tertiary isohexene with 70% to 80% sulfuric acid at a temperature within the range of 0° F. to 60° F. whereby said tertiary isohexene is absorbed by said sulfuric acid, settling said contacted admixture to form a raffinate phase and an acid extract phase, separating said acid extract phase from said raffinate phase, heating said extract phase at a rate at least 400° F. per minute to a final temperature of at least 200° F. whereby said tertiary isohexene is released from said acid extract phase, and separating said tertiary isohexene from the remaining acid phase.

2. A method in accordance with claim 1 wherein the sulfuric acid is 70% by weight.

3. A method in accordance with claim 1 wherein the heating rate is at least 2000° F. per minute.

4. A method of recovering tertiary isohexene from a fat acid admixture with 70% to 80% sulfuric acid which comprises indirectly heating said fat acid at a rate of at least 400° F. per minute to a final temperature of at least 200° F. whereby the isohexene is released from the acid and forms a hydrocarbon phase, and separating said hydrocarbon phase from said acid.

5. A method in accordance with claim 4 wherein the sulfuric acid strength is 70% by weight.

6. A method in accordance with claim 4 wherein the heating rate is at least 2000° F. per minute.

References Cited in the file of this patent

UNITED STATES PATENTS

| | | |
|---|---|---|
| 2,456,260 | Draeger | Dec. 14, 1958 |
| 2,958,715 | Hanford et al. | Nov. 1, 1960 |
| 2,968,682 | Crouse et al. | Jan. 17, 1961 |